July 21, 1931.  R. W. HARDING ET AL  1,815,435
TRACTION TREAD
Filed May 24, 1929
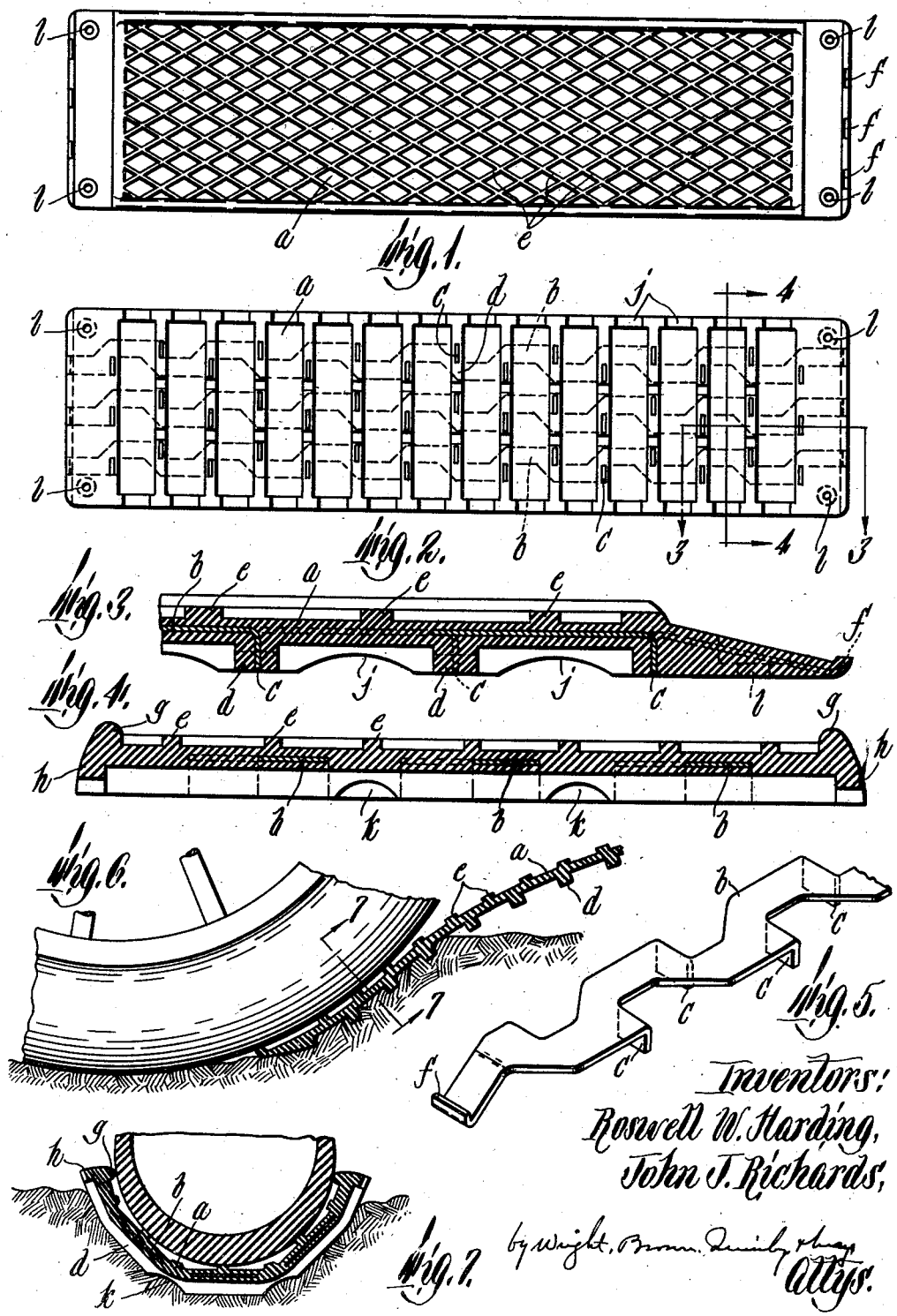

Patented July 21, 1931

1,815,435

UNITED STATES PATENT OFFICE

ROSWELL W. HARDING, OF SEDGWICK, MAINE, AND JOHN J. RICHARDS, OF BROOKLINE, MASSACHUSETTS

TRACTION TREAD

Application filed May 24, 1929. Serial No. 365,757.

The subject matter of this invention is a device adapted to be placed between the driving wheel of a self propelled vehicle, such as an automobile, and the ground to furnish an increased tractive effect to enable the vehicle to extricate itself from snow, sand, mud, etc., as well as to give greater tractive effort on a hard and slippery road surface. It is well known that the unaided driving wheels of an autmobile have little tractive effect on an icy road surface, or in deep snow, sand, or mud, and that when the wheels are embedded in soft material, or rest on ice, and the car is even slightly blocked, the driving wheels will slip and make the situation worse by deepening the depressions in which they lie. The difficulty is enhanced in the case of automobiles by the fact that the differential gearing between the two driving wheels allows one wheel to become stationary and give no tractive effort at all if the other wheel slips, so that all traction is lost with slippage of even one of the wheels. The propensity of a slipping wheel to burrow into a soft ground covering is of no benefit when such covering is deep snow, for even though the wheel eventually burrows through to the pavement or hard ground beneath, enough snow is carried with it to make a slippery film between the tire tread and the hard ground surface, on which the traction s too slight to overcome the blocking effect if snow in front of the wheels. The common tire chains help to a considerable extent in overcoming these difficulties, but the added tractive power which they give is limited at best, and it frequently happens that a car is caught in snow or boggy ground when no chains are at hand or the conditions are such that it is impossible or very difficult to put them on.

Being well aware of these untoward conditions of motor car operation, we conceived the idea of a traction device which could be placed between the ground and the tread of a wheel, without jacking up the wheel, and would have an extended contact with the ground and a high coefficient of friction with the wheel tread, by the use of which a motor car driver in difficulties of the nature above indicated, could extricate himself. After extensive study and experiment, we have finally produced a device which has the desired tractive qualities both in soft ground material, including snow, and on hard and slippery surfaces such as an ice layer on the road, and is furthermore so flexible as to afford a longer arc of contact with the wheel tread than is given by a flat road surface and to embrace the tire laterally so as in large measure to prevent flow of snow or mud between itself and the tire. We will call this device, for the purpose of a brief descriptive title, a traction tread or mat, which terms will be used generally through the following description in the sense here indicated. Not only is our traction tread adapted for the purposes above indicated, but it is adapted to serve the further functions and uses of a foot mat to be placed on the step or running board of an automobile when not in use to furnish increased traction for the wheels.

In the drawings,—

Fig. 1 is a top plan view of a traction device embodying this invention in the form which at present we prefer;

Fig. 2 is an under plan view of the traction tread or mat, showing in dotted lines the longitudinal core members which form an important feature of the device;

Fig. 3 is a partial longitudinal section taken on line 3—3 of Fig. 2 and shown on an enlarged scale;

Fig. 4 is a cross section on line 4—4 of Fig. 2, also shown on an enlarged scale;

Fig. 5 is a perspective view of a part, including one end, of one of the core members of the tread device;

Fig. 6 is an elevation in partial section showing a portion of an automobile wheel sunk in soft ground with our tread device in operative association therewith;

Fig. 7 is a cross section on line 7—7 of Fig. 6 showing the manner in which the tread device wraps itself about the wheel tire to exclude soft or loose ground material from between itself and the tire.

Like reference characters designate the same parts wherever they occur in all the figures.

Describing the specific embodiment of the invention here shown, it consists of a piece of flexible vulcanized rubber *a* in which are embedded and enveloped a number of longitudinal metal core pieces *b* which extend side by side and are independent of one another except for the union made by the continuous enveloping rubber body.

The core pieces are an important adjunct of the tread device, for they give it an adequate longitudinal stiffness, but without preventing it from bending conformably to the wheel tread, and they also furnish calks *c* adapted to protrude from the under side of the tread device and cut into hard ground material. As already stated, these core pieces are preferably made of metal. They may be cut from sheet steel of low enough carbon content to be easily worked in the manner herein described, or from any other material having suitable characteristics and constructed in any desired way.

The core pieces here shown are cut first as a strip of sheet metal of uniform width, and from the portions at opposite sides of the longitudinal middle line tabs or tongues are partially severed, such tongues being in a staggered arrangement such that those at either side of the middle line are about midway between those at the other side of the line. These tabs are then bent down all in the same direction, at about right angles to the plane of the strip, so that they form the calks shown at *c*, such calks having edges the thickness of which is determined by the thickness of the original stock, and the length of which extends crosswise of the strip. The exact thickness of the sheet metal is of minor importance, and considerable variation is possible in respect thereto.

In combining the core pieces with the rubber body, the core pieces are placed side by side in a mold and embedded with a vulcanizable rubber composition, which is vulcanized in a known manner. The invention is not limited as to the quality or ingredients of the rubber composition, but these factors may be varied according to the choice of the manufacturer.

The core pieces are placed so that their calks protrude toward the side which is designed to come underneath when the traction mat is applied to the ground, and the rubber body is formed with ribs or projections *d* in which the calks are embedded and with the outer faces of which their edges are substantially flush. Preferably corresponding calks of the several core pieces are alined with each other, as shown in Fig. 2 so that the ribs *d* extend straight across the full width of the mat; but this is a detail which may be varied within wide limits. Preferably also the upper side of the mat is formed with intersecting ribs *e* forming a cellular surface, or with other types of projection adapted to give a good tractive effect with the tread of the tire. The ends of the mat are tapered to substantially less thickness or height than the main part, and the ends of the core pieces embedded therein are inclined conformably to the taper and formed with shallow upturned hooks *f* in order to give a strong tractive effect when the end of the mat is placed in the angle between the tire tread and the ground and the wheel commences to ride over it.

Upper and lower beads *g* and *h* are provided along the side edges of the mat body. The lower beads are recessed as shown at *j* in Fig. 3 between the transverse ribs *d*; and such ribs are recessed as shown at *k* in Fig. 4 beneath the spaces between adjacent core members in order to provide flexibility enabling the mat to become wrapped about the tire of a wheel, as shown in Fig. 7, without liability of straining the ribs to the point of rupture.

In using this traction tread mat its end is shoved into the angle between the wheel tire and the ground. By virtue of the hook formation of either end, the tire is then slightly indented and gripped so that it has an inital tractive effect which assists it in riding upon the mat. The transverse ribs *d* sink into soft material such as snow, sand or mud, and so exert a powerful tractive effort. In case there is a coating of ice on the ground, the weight of the wheel compresses the ribs *d* and causes the calks to protrude and cut into the ice, so that in these conditions also there is a strong tractive effect. Between the wheel tire and the tread mat is the frictional traction of rubber to rubber, which may be increased by interlocking of the ribs, etc. formed on the adjacent surfaces of the mat and tire. When the wheel is embedded in soft material, the lateral flexibility of the tread mat allows the ground material to wrap it about the tire conforming it to the transverse curvature thereof, as shown in Fig. 7.

There are no perforations through the body part of the mat, but a continuous impervious layer of body composition from edge to edge and from end to end thereof. This characteristic and the flexibility both laterally and longitudinally of the mat cause snow or mud to be excluded from between the traction mat and the tire even though the wheel may be somewhat deeply embedded. The mat forms in effect a trough by which the embedded part of the wheel is embraced.

When the traction device is not in use for traction purposes, it is placed on the running board or step, where it may be secured by studs or other fastenings on the step entering snap sockets or holes *l* in the mat. When thus stowed, it is not only out of the way but it also serves the useful purpose of a foot mat. The upper bead *g* on the outer side then serves as a scraper. The mat may be thus stowed with either edge outward. The recesses *j* in the lower beads are useful at such times for drainage and ventilation of the spaces beneath the mat.

Variations from the specific construction hereinbefore described may be made without departing from the spirit of the invention or the protection here claimed. For instance, the mat may be made in any dimensions suited to wheel tires of different sizes and to longer or shorter automobiles, its length being limited only by the distance between front and rear wheels of the car and to the necessity of placing it between the front and rear wheels when it is used for forward traction. Any desired number, from one upward, of core pieces may be used. A single core piece is placed approximately midway between the sides of the mat body, while two or more are arranged symmetrically with respect to the longitudinal middle line. The width of the core pieces is limited only by the width of the mat as a whole, except in so far as it is desired to permit transverse bending to permit the mat to be wrapped about the tire, as shown in Fig. 7. The flexibility of the mat body between core pieces which permits it thus to conform to the transverse curvature of the tire, combined with its comparative stiffness longitudinally due to the core pieces, causes the mat to become automatically self alining with the wheel to a considerable degree, largely avoiding danger of the wheel running off from the edge of the mat between its ends. Other materials or compounds than vulcanized rubber may be used in the body of the mat. For example, the body may be made of two or more plies of heavy fabric, leather, etc., with the core pieces between them, stitched or otherwise secured together along the spaces at each side of and between the core pieces. The core pieces are in effect stiffeners and holders or bases for the calks, and may be so called. However, discontinuous calks may be provided, in longitudinal alinement either separated or overlapping, or any other desired arrangement, instead of the continuous pieces running the whole length of the mat.

It will be obvious that traction tread mats of the sort herein described may be placed either in front or in rear of the driving wheels to aid in obtaining either forward or rearward traction, and that to get the best effects two mats should be provided, one for each wheel.

What we claim and desire to secure by Letters Patent is:

1. A traction tread device comprising a substantially imperforate body of vulcanized rubber adapted to be placed between the tread of a driving wheel and the ground, having projections on its under side adapted to indent soft or granular ground surface.

2. A traction tread device comprising a substantially imperforate body adapted to be placed between the tread of a driving wheel and the ground, having projections on its under side adapted to indent soft or granular ground surface and having embedded calks in said projections adapted to protrude through said projections when the latter are compressed between the wheel and a hard ground surface.

3. A traction tread mat comprising a body structure of substantially impervious flexible material and longitudinal stiffening members connected to said body structure.

4. A traction tread mat comprising a body structure of substantially impervious flexible material and longitudinal stiffening members connected to said body structure, said body structure being of diminishing thickness from points near its ends to the adjacent ends, and the stiffening members being upturned at their ends to indent the tire of a wheel between which and the ground the end of the mat is inserted.

5. A traction tread mat comprising a body structure of substantially impervious flexible material and longitudinal stiffening members connected to said body structure, the stiffening members having calks projecting toward the under side of the mat and the body thereof having compressible ribs or equivalent projections in which said calks are embedded and from which they are adapted to protrude upon compression of the ribs.

6. A traction tread mat comprising an imperforate body portion of vulcanized rubber composition and longitudinally extending laterally separated core strips embedded in said body.

7. A traction tread mat comprising an imperforate body portion of vulcanized rubber composition and longitudinally extending laterally separated core strips embedded in said body, said core strips having downturned tabs, and the body having ribs on its under side embedding said tabs and substantially flush with the ends of the tabs.

8. A wheel traction tread mat comprising a body of vulcanized rubber composition having transverse ribs on its under side, a cellular upper face and beveled ends and core strips extending longitudinally of said body side by side embedded therein, having calks projecting toward the bottom side of the body and embedded in the before named ribs and having ends embedded in the beveled ends of the body and formed with upturned hook portions to indent a wheel tire when placed in the angle between the tread tire and the ground.

9. A traction tread mat of the character set forth having means for detachable attachment as a foot mat on the upper side of the running board of an automobile.

10. A traction tread mat of the character set forth adapted to be placed on the running board of an automobile and having sockets suitably placed for engagement with holding studs on the running board.

11. A traction tread mat comprising an impervious body of dimensions adapting it to be placed on the running board of an automobile and provided with securing means for detachable engagement with complemental securing means on such running board; the mat having a rising bead extending along one of its side edges adapted to serve as a scraper.

12. A traction tread mat comprising a body of vulcanized rubber of substantially rectangular outline adapted to be interposed between the tread of a wheel and the ground, and also adapted when not used in that manner to be placed on the running board of an automobile; said body having beads along its longitudinal edges extending both above and below its intermediate substance, having on its upper side intersecting ribs, lower than the upper beads, forming a cellular surface, and having on its lower side transverse ribs, the upper bead on the outer side serving as a scraper when the mat is placed on the running board, and the lower beads and transverse ribs having discontinuous recesses for flexibility, drainage and ventilation.

13. A traction tread mat having longitudinal stiffness, greater than its lateral stiffness, sufficient to cause its end to be crowded between the tread of a wheel and the ground by thrust applied to the other end, and having such flexibility laterally that it will be wrapped around the tire of the wheel by soft ground between which and the wheel it is placed, and being substantially impervious to the substance of the ground and having projections on its under side adapted to protrude into the ground.

In testimony whereof we have affixed our signatures.

ROSWELL W. HARDING.
JOHN J. RICHARDS.